Dec. 13, 1955     F. D. SQUIER     2,726,519
ABSORPTION-COOLED VAPOR CONDENSER SYSTEM
Filed Sept. 23, 1954
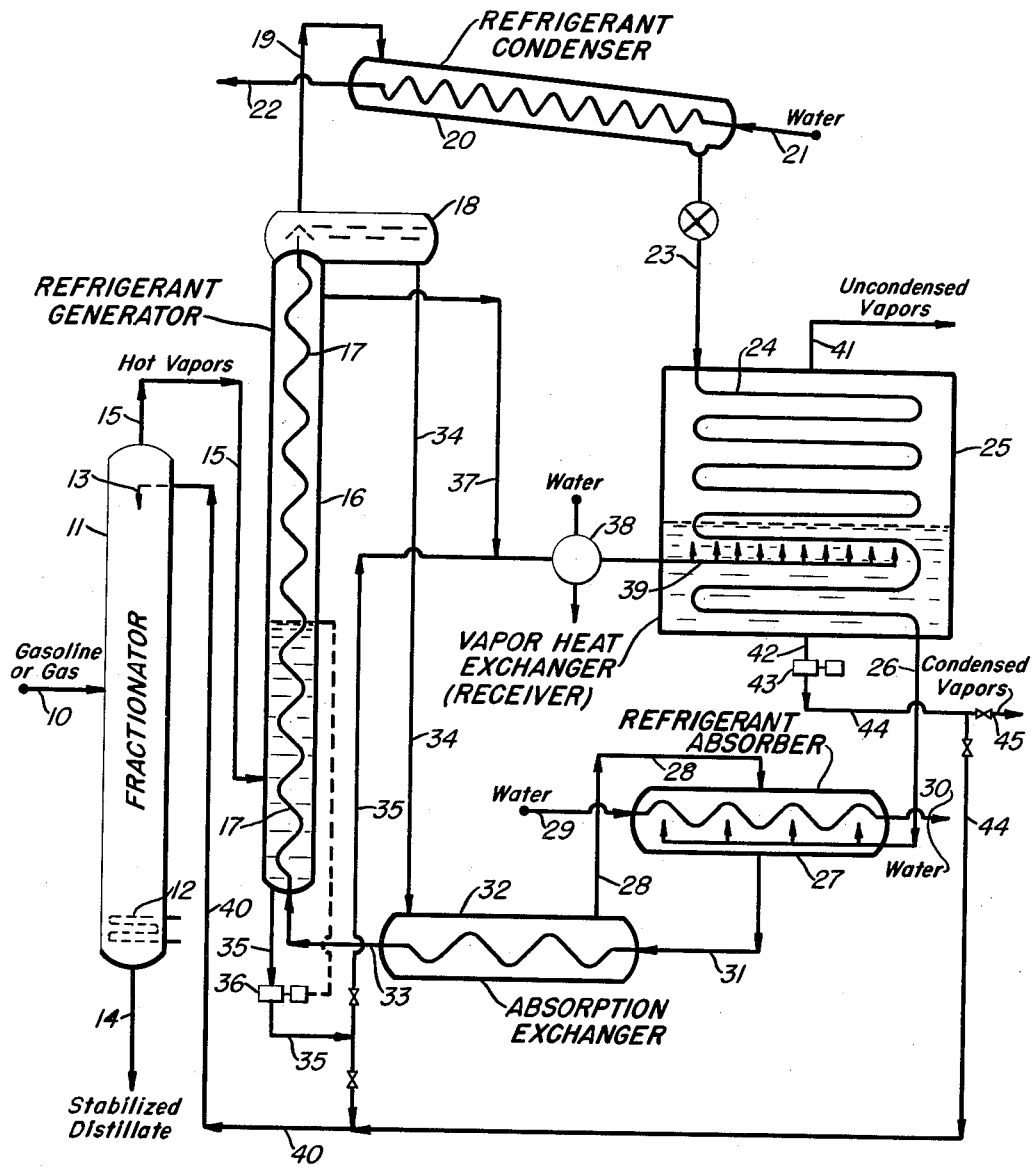
INVENTOR.
Frank D. Squier
BY *Donald E. Payne*
ATTORNEY United States Patent Office 2,726,519
Patented Dec. 13, 1955

2,726,519

ABSORPTION-COOLED VAPOR CONDENSER SYSTEM

Frank D. Squier, Park Forest, Ill., assignor to Standard Oil Company, Chicago, Ill., a corporation of Indiana Application September 23, 1954, Serial No. 457,971

3 Claims. (Cl. 62—175.5)

This invention relates to an improved absorption-cooled vapor condenser system and it pertains more particularly to an improved method and means for utilizing the heat energy of a hot process vapor stream for effecting the cooling and condensation thereof at a controlled temperature so that the vapor stream to be condensed and/or fractionated serves as an integral part of an absorption refrigeration system.

In many industries it is essential that a hot process vapor stream be cooled to effect at least partial condensation thereof and this is usually accomplished by heat exchange with available condenser water. The temperature of available condenser water varies with the seasons from about 40° F. to 90° F. and in many instances it is necessary to cool the condenser water itself before using it to condense the vapor stream. Another alternative is the use of a compression type refrigeration system which increases the problems of maintenance and control. An object of this invention is to provide a method and means for condensing vapors which will avoid the necessity of cooling available condenser water and which will avoid the necessity of employing a mechanical or compression type of refrigeration system. A further object is to integrate a fractionation or condensing system with a hermetically sealed absorption type refrigeration unit which will not require the use of an external non-process source of heat energy such as steam or mechanical compression but in which the energy required for effecting refrigeration is supplied by the energy in the hot vapor stream itself. A further object is to provide improved methods and means for controlling the operation of such an integrated system. Other objects will be apparent as the detailed description of the invention proceeds.

In absorption refrigeration systems, which are well known to those skilled in the art, the heat energy for liberating refrigerant from absorber liquid has theretofore been supplied by steam or a fuel burner and the expansion of the condensed refrigerant has been utilized to cool water, brine, or other heat exchange liquid. In practicing my invention the hot process vapors to be condensed are first heat exchanged with rich absorber liquid in the refrigeration generator so that the heat energy for stripping refrigerant out of the absorber liquid is supplied by the hot process vapors which require condensation. The vapors, which have been partially cooled in the refrigeration generator, with or without condensate formed in this heat exchange step, are then heat exchanged with expanding refrigerant vapors in the absorption refrigeration cycle wherein further condensation and/or cooling is effected. If condenser water is available, it may be employed for cooling the refrigerant condenser, the refrigerant absorber and the partially cooled vapors and/or liquids which have given up a portion of their heat in the generator and are to be further cooled in the vapor heat exchanger; when no condenser water is available the refrigeration system may be designed so that these portions of the system are air cooled.

As applied to the fractionation of hydrocarbons, the hermetically sealed absorption type refrigeration system may take the place of the conventional heat exchanger and condensate receiver, the vapor heat exchanger of the refrigeration system constituting the condensate receiver itself. Hot hydrocarbon vapors comprising light gasoline fractions and normally gaseous hydrocarbons are introduced from the top of a fractionator directly into the refrigeration generator of a hermetically sealed absorption refrigeration system to supply the heat for liberating refrigerant from absorber liquid. Part of the hydrocarbons condense in the exchanger coils in the generator. Condensate is removed from the base of the generator at a rate to control the condensate level. The withdrawn condensate and uncondensed gases and vapors are preferably cooled by available cooling water and then introduced into the condensate receiver for direct contact with the coils wherein refrigerant is expanding, i. e. the vapor heat exchanger. Further condensation of vapors is effected in the vapor heat exchanger so that liquid may be withdrawn therefrom at a substantially constant temperature usually in the range of about 50 to 80° F. and uncondensed gases are removed from the top of the vapor heat exchanger at substantially the same temperature. By thus maintaining the condensation temperature substantially constant regardless of variations in cooling water temperature, the composition of the condensate and of the uncondensed vapors, respectively, are likewise maintained substantially constant so that each may be subsequently processed or utilized with maximum effectiveness and efficiency.

The invention will be more fully understood from the following detailed description of a specific example read in conjunction with the accompanying drawing which forms a part of this specification and which is a schematic flow diagram illustrating the application of my invention to the condenser portion of a hydrocarbon fractionation system.

In the catalytic cracking of hydrocarbons the reactor overhead passes to a first fractionator wherein a gasoline fraction containing dissolved normally gaseous hydrocarbons is separated from gas oils and heavier hydrocarbons. The gasoline fraction is next introduced into a second fractionator for separating stabilized naphtha from light ends which must be condensed and charged to a vapor recovery unit. It is desirable that the light ends be condensed and separated at a constant temperature of about 80° F. but this is impossible when the available condenser water is at a temperature of about 75 to 90° F. The invention will be described as applied to such a system.

The mixture of gases and gasoline from the first fractionator of a catalytic cracking unit is introduced by line 10 to the second fractionator 11 which is provided with a conventional reboiler 12 and reflux means 13, stabilized naphtha being withdrawn from the fractionator through line 14. Overhead vapors are removed by line 15 from the top of tower 11 at a temperature of about 250° F. and are introduced into refrigerant generator 16 to heat rich absorber liquid in coil 17, coil 17 forming a part of a hermetically sealed absorption type refrigeration system.

The hermetically sealed absorption refrigeration system is preferably of the type described in "Servel Absorption Type 25-Ton Water Chiller Model DUT, Steam Operated, Equipment Data" (Copyright 1951). Note also "Refrigeration Engineering," June 1949, pages 553 et seq. The hermetically sealed unit contains lithium bromide as the absorber liquid and water as the refrigerant, the sealed system operating at an absolute pressure of about 4 mm. of mercury. Water is stripped from the lithium bromide in coil 17 and the liberated water vapor separated from the absorber liquid in separator 18. The water vapors are introduced by line 19 into refrigerant condenser 20 which may be air cooled but which is preferably cooled by available condenser water introduced by line 21 and withdrawn through line 22. Condensed water then passes through trap 23 into expansion coils 24 wherein the water is vaporized to provide refrigeration to cool gases and liquids in vapor heat exchanger 25. The water vapors then pass by line 26 to absorber 27 wherein they are absorbed by lithium bromide introduced through line 28, the heat of absorption being removed by available condenser water introduced through line 29 and removed through line 30 or by forced air circulation if condenser water is not available. The rich absorber solution then passes through coil 31 of absorption exchanger 32 and back through line 33 to coil 17 in generator 16. Absorber liquid which separates from water in separator 18 is withdrawn through line 34, cooled in absorption exchanger 32 and then introduced by line 28 into absorber 27 as hereinabove described. No invention is claimed in the refrigeration system per se since it is fully described in the Servel publication and may be readily adapted by those skilled in the art to provide the desired amount of refrigeration required in the hydrocarbon condensing system. The types of controls on the refrigeration unit per se are also described in the Servel publication so that no further description thereof is necessary.

It should be noted, however, that instead of employing steam or fuel combustion for supplying the required heat energy, my system utilizes the heat energy contained in thee vapors which are to undergo condensation. The hot vapors introduced by line 15 into generator 16 are partially condensed. Condensate is removed from the base of the generator by line 35 by pump 36 which is regulated to maintain any desired hot condensate level. Changing the level of hot condensate changes the heat transfer coefficient and thus the amount of heat supplied to the liquid in coil 17 may be controlled to a certain extent by pump 36. Condensate discharged by pump 36 and vapors withdrawn from the upper part of the generator through line 37 may be passed through a heat exchanger 38 and further cooled to temperatures attainable with available condenser water, the cooled vapors and liquids then being introduced by distributor 39 at the lower part of vapor heat exchanger or receiver vessel 25. At least a part of the liquid discharged by pump 36 is preferably returned by line 40 to provide the reflux introduced at the top of the fractionator tower. By maintaining some of the coils 24 in vessel 25 submerged in condensate liquid, and some directly exposed to vapors, a high heat transfer coefficient is obtained, further condensation of hydrocarbon vapors is effected as the vapors pass upwardly in direct contact with expansion coils 24 and both condensate and uncondensed gases and vapors are brought to substantially the same temperature. The uncondensed gases and vapors which are removed by line 41 are, therefore, of substantially constant composition. Likewise the condensate removed through line 42 by pump 43 is of substantially constant composition. A portion of the condensate may, if desired, be returned by line 44 to serve as reflux in fractionator 11 and the net condensate is removed through line 45.

Since the refrigeration system itself is hermetically sealed and contains no moving parts, the maintenance problem is minimized. The design of a refrigeration system to effect cooling and condensing of a process stream to a desired temperature level requires, of course, proper selection of absorber liquid, refrigerant, and operating pressure in the hermetically sealed system, as is well known to those skilled in the art. When no condenser water is available, the refrigerant condenser, refrigerant absorber and heat exchanger 38 may be cooled by forced air circulation or other conventional means.

From the foregoing description it will be seen that the objects of the invention have been attained, that the hermetically sealed absorption type refrigeration system is integrated with a hydrocarbon fractionation and condensing system in a unique manner so that the heat energy of the process vapors to be condensed provides the energy required for operating the system and additional heat is abstracted from the hydrocarbon vapors by direct contact with the expansion coils in the refrigeration system. The control of condenser temperature and condensate composition is thus more precise and convenient than has heretofore been attainable.

I claim:

1. The method of effecting partial condensation of a mixture of hot hydrocarbon vapors, which method comprises introducing said hot hydrocarbon vapors into the generator of a hermetically sealed absorption refrigeration system whereby heat from said vapors liberates refrigerant from absorbent in said system and the vapors are partially condensed, removing condensate and uncondensed vapors from said generator, cooling condensate removed from the generator, maintaining a body of said cooled condensate in direct contact with the lower part of the expansion coils of the refrigeration system, and finally contacting the uncondensed vapors with expansion coils of the refrigeration system by passing said uncondensed vapors from the top of the refrigerant generator upwardly in contact with the upper part of said expansion coils for effecting further condensation.

2. The method of effecting partial condensation of a mixture of hot hydrocarbon vapors obtained as an overhead stream from a fractionating tower, which method comprises introducing said hot hydrocarbon vapors into the generator of a hermetically sealed absorption refrigeration system whereby heat from said vapors liberates refrigerant from absorbent in said system and the vapors are partially condensed, removing condensate and uncondensed vapors from said generator, returning a part of the removed condensate to the upper part of the fractionating tower to serve as reflux liquid therefor, and finally contacting at least the uncondensed vapors with the expansion coils of the refrigeration system for effecting further condensation.

3. The method of effecting partial condensation of a mixture of hot hydrocarbon vapors, which method comprises introducing said hot hydrocarbon vapors into the generator of a hermetically sealed absorption refrigeration system whereby heat from said vapors liberates refrigerant from absorbent in said system and the vapors are partially condensed, removing condensate and uncondensed vapors from said generator, controlling the rate of condensate removal from the refrigerant generator in order to control the hot condensate level therein and thus to control the rate of heat transfer from condensing vapors to the refrigerant generator, and finally contacting at least the uncondensed vapors with the expansion coils of the refrigeration system for effecting further condensation.

References Cited in the file of this patent
UNITED STATES PATENTS

| | | |
|---|---|---|
| 1,782,220 | Wanamaker | Nov. 18, 1930 |
| 2,336,097 | Hutchinson | Dec. 7, 1943 |
| 2,548,508 | Wolfner | Apr. 10, 1951 |